United States Patent Office 3,441,545
Patented Apr. 29, 1969

3,441,545
MODIFICATION OF OLEFIN-CARBOXYLIC ACID HALIDE COPOLYMERS
Philip Strubing Blatz and Daniel Edwin Maloney, Wilmington, Del., assignors to E. I. du Pont de Nemours and Company, Wilmington, Del., a corporation of Delaware
No Drawing. Filed Nov. 1, 1963, Ser. No. 320,848
Int. Cl. C08f 27/12, 27/08, 27/06
U.S. Cl. 260—78.5    10 Claims The present invention relates to polymeric modifiers for the modification of properties of hydrocarbon polymers.

Although hydrocarbon polymers are considered to have an unusual combination of useful chemical and physical properties which are based on the chemical structure of the polymer itself, the utility of hydrocarbon polymers can be improved by the addition of compounds which enhance specific properties of the resin. Such additives include antioxidants, antistatic agents, light stabilizers, flame retardants, plasticizers, water repellants, to mention just a few. Many of these additives, however, have the disadvantage that they are only compatible with the polymer to a limited degree or if compatible will exude out of the material causing a deterioration in the property which is improved by the additive. Many compounds, furthermore, are completely ruled out because of incompatibility and exudation.

It is, therefore, one of the objects of the present invention to provide a method of modifying properties of hydrocarbon and other polymers by the use of additives. It is another object of the present invention to provide polymeric modifiers which are compatible with hydrocarbon polymers and do not exude.

In accordance with the present invention, polymeric modifiers are formed by the reaction of an essentially linear addition polymer of a terminally unsaturated monomer containing at least 0.1 mole percent, based on the copolymer, of a polymerized unsaturated carboxylic acid halide having from 3 to 8 carbon atoms with at least one modifying compound having a molecular weight of less than 2000, containing at least one group reactive with alkanoic acid halides, and recovering a polymeric modifier containing from 0.1 to 50 mole percent based on the copolymer of acid halide groups reacted with said modifying compound. Specific functional groups which react with the acid halide groups of the polymers employed herein are alcoholic hydroxyl groups, amino groups containing at least one hydrogen bonded to nitrogen, i.e., greater than NH, enolizable carbon hydrogen groups, mercapto groups, thiocarboxylic acid groups and phosphino groups. The acid halide polymers, as do the alkanoic acid halides, react with all compounds which contain a reactive group wherein the reactivity is based on an ionizable hydrogen atom, if such group has a lower acidity than the acid group in the copolymer. Those active hydrogen groups containing compounds which form alkali metal salts can also be employed in the form of the alkali metal salt derivatives. The ability of any reactive group to react with the acid halide polymer is readily established by a simple test which comprises reacting the compound containing the reactive group with an alkanoic acid halide, such as acetyl chloride. It is, however, to be understood that certain reactive groups, such as primary alcohols and amines, react more readily and, therefore, preferentially with the acid halide polymer. In addition to undergoing reactions based on reactive hydrogen, the acid halide copolymers also react with the metal salt derivatives of compounds containing the aforesaid active hydrogen containing groups, particularly the alkali metal salts. Other means of forming the polymeric modifiers include the reaction of acid halide copolymers with compounds containing aromatic hydrogen in the presence of a Friedel Crafts catalyst and reaction with Grignard reagents, both of which are typical of alkanoic acid halides.

One of the surprising features of the olefin carboxylic acid halide polymers is their ease of reaction. Whereas polymeric acids and, particularly, copolymers of olefins and carboxylic acids, undergo the reactions of the monomeric acid with extreme sluggishness or not at all, the acid halide copolymers exhibit reactivity which is similar to that of the monomeric acid halide. Hence, it is possible to employ the chemistry of acid halides generally to the polymeric acid halides employed in the present invention.

The acid halide polymers employed to prepare the polymeric modifiers in accordance with the present invention are addition polymers of ethylenically unsaturated monomers containing a carboxylic acid halide group or ethylenically unsaturated monomers copolymerized with ethylenically unsaturated carboxylic acid halides. The particular type of polymer employed to form the polymeric modifier will depend on the end use thereof and is particularly determined by the compatibility of the polymeric modifier with the polymer to be improved by the addition of the modifier. Acid halide homopolymers, although suitable for the preparation of polymeric modifiers, generally do not increase compatibility over the modifier itself and it is generally preferred from the standpoint of compatibility to employ acid halide copolymers in which the comonomer is selected to provide the compatibility in the end use of the polymeric modifier.

Although a wide class of comonomers can be employed, excluded from the class are those comonomers which would react with the acid halide groups and cause formation of crosslinked polymers. It will be readily understood that a crosslinked material will not react with the modifying compound to any significant degree and, furthermore, even if reacted, will not increase compatibility. Hence the acid halide copolymers must be substantially linear addition copolymers. The acid halide copolymers employed in the present invention should contain at least one acid halide group per molecule in order to be able to give rise to a polymeric modifier which contains any appreciable concentration of the modifying compound. For practical purposes, the concentration of the acid halide monomer in the polymer should be at least 0.1 mole percent of the polymerized monomer units. Although the acid halide comonomer concentration can be extended to as high as 50 mole percent, it is generally preferred to employ concentrations of not more than 25 mole percent. Such concentrations provide sufficient acid halide groups to which to attach the polymer property modifiers in all desirable concentrations. Higher acid halide ratios reduce compatibility of the polymeric modifiers with hydrocarbon polymers and, furthermore, leave unreacted acid halide groups. The latter problem, however, is readily overcome by neutralization of the acid halide group with ammonia or other reagents which do not affect the hydrocarbon polymer to which the polymeric modifier is added.

The acid halide copolymers suitable in the formation of polymeric modifiers are obtained by the halogenation of the corresponding acid copolymers using a phosphorus pentahalide which is passed through a solution of the acid polymer. Other methods employed in the formation of the acid halide copolymer are described in copending application Ser. No. 254,567, filed Jan. 29, 1963. It is to be pointed out that the direct polymerization of ethylenically unsaturated acid halides does not result in the formation of polymeric materials which are suitable in the formation of polymeric modifiers.

The acid halide groups in the base copolymer are obtained by the polymerization of an α,β-ethylenically unsaturated acid containing preferably from 3 to 8 carbon atoms which is then halogenated. Examples of such acids are acrylic acid, methacrylic acid, itaconic acid, maleic acid, crotonic acid, fumaric acid, glutaconic acid, and cinnamic acid. In the case of the polycarboxylic acids, one of the acid groups can be esterified. The carboxylic acid group containing monomers may be homopolymerized or copolymerized. It is to be realized, however, that the homopolymers of the ethylenically unsaturated acids on halogenation may be completely halogenated to become acid halide polymers or partially halogenated to be in effect copolymers of the acid and the acid halide. It is, of course, only necessary that sufficient acid groups be halogenated to cause reaction with the modifier. Although the acid halide may be a chloride, a bromide, a fluoride or an iodide, it is preferred to employ the chloride because the chlorination reaction of the acid copolymer is readily achieved and controlled, because the reaction with the substrate proceeds smoothly, and because the chloride is the most economic to use.

The defined ethylenically unsaturated acids can also be copolymerized with ethylenically unsaturated monomers to give rise to acid polymers which can, in turn, be converted to the acid halide copolymer as indicated above.

The acid halide copolymers derivable through halogenation of the corresponding carboxylic acid copolymers include the copolymers of the said carboxylic acids with ethylenically unsaturated monomers having the general formula

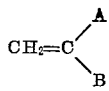

where B is a hydrogen or hydrocarbon group, such as an alkyl group or an aromatic group, a halogen, such as chlorine or bromine, a carboalkoxy group such that the monomer is an acrylate or methacrylate, an acyloxy group, such that the monomer is a vinyl ester, an ether group, such as an alkoxy group, a nitrile group, or an aldehyde group, such that the monomer is an acrolein or a substituted acrolein; and where A is a hydrogen, methyl or a halogen group. The formation of the modifiers is, however, not limited to acid halide group containing polymers derived from copolymers of the aforesaid monomers with ethylenically unsaturated acids, but as has already been indicated, can be extended to all types of acid halide copolymers which contain no functional groups reacting with the acid halide group.

The praparation of the copolymers from which the acid halide copolymers are derived is well known in the literature and is for that reason not described in detail here. In general, the polymers are formed by direct copolymerization of the monomers employing a free radical catalyst, such as a peroxide, or Friedel Crafts and related ionic catalysts. The polymerization is generally carried out in the presence of an inert solvent, such as a liquid hydrocarbon or water, but may also be carried out in bulk when the monomers are liquid at reaction conditions.

Of particular interest in the formation of polymeric modifiers are hydrocarbon polymers which contain the acid halide groups. Since the problems of incompatibility and exudation appear to be the greatest in the field of hydrocarbon polymers, it is clear that polymeric modifiers which are compatible with hydrocarbon polymers provide a particularly significant advance in the art. Polymeric modifiers compatible with hydrocarbon polymers have preferably a hydrocarbon structure themselves and, hence, the preferred polymeric modifiers of the present invention are those obtained from copolymers of olefins and carboxylic acid halides.

The preferred hydrocarbon polymers employed in the formation of polymeric modifiers are copolymers of olefins having the formula R—CH=CH$_2$, where R is either a hydrogen or an alkyl or alkenyl radical of one to 8 carbon atoms or an aryl radical of 6 to 12 carbon atoms with the acid halides of the described carboxylic acids. Thus, suitable olefins include ethylene, propylene, butene-1, pentene-1, hexene-1, heptene-1, 3-methylbutene-1, 4-methylpentene-1, butadiene, isoprene, styrene, etc. Although polymers of olefins having higher carbon numbers can be employed in the present invention, they are not materials which are readily obtained or available. The concentration of the olefin should be at least 50 mole percent in the copolymer and is preferably greater than 80 mole percent. As indicated above, the concentration of the acid halide comonomer in the polymer should be at least 0.1 mole percent and can be as high as 50 mole percent.

The preparation of the hydrocarbon acid copolymer from which the acid halide copolymers are derived is also known in the literature and is for that reason not described in detail here. In general, the polymers are formed by direct copolymerization of the hydrocarbon and acid monomers employing free radical catalysts such as peroxides, or Friedel Crafts and related ionic catalysts. The direct copolymerization of the acid comonomer and the olefin followed by halogenation is preferred for olefins such as ethylene, styrene and butadiene. The hydrocarbon copolymer reagents, however, can also be obtained by grafting the acid comonomer to a polyolefin base. Such graft copolymerization is preferred for olefins which can be homopolymerized, such as propylene or butene-1, but do not lend themselves readily to copolymerization with ethylenically unsaturated acids. Copolymers of α-olefins with carboxylic acids may also be prepared by copolymerization of the olefin with an α,β-ethylenically unsaturated carboxylic acid derivative which subsequently or during copolymerization is reacted either completely or in part to form the free acid which is then halogenated. Thus, hydrolysis, saponification or pyrolysis may be employed to form an acid copolymer from an ester copolymer. It is pointed out, however, that random olefin/acid halide copolymers obtained by direct copolymerization constitute the preferred class of copolymers because of better distribution of the chemical compound reacted therewith.

The particular composition of the hydrocarbon acid halide copolymer can be varied widely and can be readily tailored to meet the particular application with respect to either the polymer to which the polymeric modifier is added or the chemical compound which imparts the modifying property or both. The acid halide copolymer need not necessarily comprise a two component system. Thus, although the olefin content of the copolymer should be preferably 50 mole percent, more than one olefin can be employed to provide the hydrocarbon nature of the molecule. Additionally, any stable copolymerizable third monomer can be employed in combination with one or more olefins or carboxylic acid halides. The scope of the acid copolymers suitable for conversion to acid halide copolymers is illustrated by the following examples: Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/vinyl acrylate copolymers, ethylene/methacrylic acid/vinyl acetate copolymers, ethylene/acrylic acid/vinyl formate copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/acrylic acid/maleic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, poly-3-methylbutene/acrylic acid graft copolymers, polyethylene/acrylic acid/ethyl acrylate graft copolymers, styrene/acrylic acid copolymers styrene/butadiene/acrylic acid copolymers, styrene/maleic acid copolymers, butadiene methacrylic acid copolymers and styrene/vinyl acetate methacrylic acid copolymers.

The polymeric modifiers of the present invention are prepared by the reaction of the acid halide copolymer with a chemical compound having the desired modifying property and containing in addition, preferably, an active hydrogen containing group or its alkali metal derivative. Whether a certain group will react with polymeric acid halides is readily established by reference to its reactivity with a simple acid halide such as acetyl chloride. As with monomeric acid chlorides, it has been found that the primary aliphatic amine group —$CH_2NH_2$, the primary alcoholic hydroxyl group —$CH_2OH$, or alkali salts thereof react most readily with the acid chloride containing polymer. In some cases, these groups will give a stoichiometric reaction. In most cases, however, the reaction will go 60 to 90 percent to completion. Should the unreacted acid halide group be undesirable in the polymeric modifier, it can readily be converted to the more inert amide group by addition of, for example, ammonia, which quantitatively converts the acid halide group to the amide group. The by-product of the reaction forming the polymeric modifier is either a hydrogen halide or a metal halide. It is generally preferred that the reaction is carried out such that the by-product is removed from the reaction environment during the formation of the polymeric modifier. Where the hydrogen halide is the by-product this is accomplished by carrying out the reaction at elevated temperatures or reduced pressures at which the hydrogen halide is vaporized. In the case of the metal halide, the reaction is carried out in an organic solvent in which the halide is insoluble. A tertiary amine may also be used to inactivate the hydrogen halide by forming an amine salt. The preferred method of preparing the polymeric modifiers comprises carrying out the reaction in an inert hydrocarbon solvent such as benzene, toluene, cyclohexane and saturated hydrocarbon fractions obtained from the cracking of petroleum in which the copolymer is soluble at elevated temperatures. The reaction may further be carried out with polymer swollen with solvent or molten polymer as the medium to which the chemical modifier is added. The reaction may be carried out at any temperatures at which the reagents are stable. Usually, temperatures will range from room temperature to 300° C. Pressure is suitably employed where the solvent would otherwise vaporize at the reaction temperature, but is otherwise not critical. Although the ratio of reagents is preferably stoichiometric or greater with respect to the acid halide groups, less than stoichiometric quantities of the modifier may be employed and will cause the bonding of the modifier to the acid halide copolymer.

Since the function of the acid halide copolymer is to cause the retention of the chemical modifier in the polymer to which it is added and to provide compatibility with the polymer to which the modifier is to be added, the molecular weight of the acid halide copolymer is not critical, although in general a normally solid acid halide copolymer is preferred. A representative range of molecular weights of copolymers is a melt index range (ASTM-1238-57T) of 0.1 to 5000 dg./min.

Although the acid halide copolymers react with all active hydrogen containing organic compounds, the preferred compounds are those which contain a primary amino or amido group —$NH_2$, a secondary amino, amido or imido group, —NH, and an alcoholic hydroxyl group —OH. The compounds employed as modifiers may contain more than one of these reactive groups which may be the same or different, and, if the same, may have a different reactivity because of the chemical structure adjacent to the reactive group. In compounds containing two or more reactive groups, the reaction will, in general, occur mainly with the one which contains the most active hydrogen. Compounds which contain more than three groups of equivalent reactivity are generally not employed. The compounds which are reacted with the acid halide copolymers to form the polymeric modifiers are organic compounds which, in general, have molecular weights of less than 2000 and are generally monomeric compounds, although low molecular weight polymeric materials which do not contain the active hydrogen containing group in the repeating monomer unit are also within the scope of the present invention.

The amount of modifier reacted with the acid halide copolymer will differ depending on the proposed utility of the polymeric modifier. Thus, for example, in some applications a high degree of compatibility is desired with a modifier that is effective in low concentrations. If the modifier is highly reactive with the acid halide copolymers, a low concentration acid halide copolymer with a right degree of compatibility is selected and only part of the acid halide groups are reacted. Thus, by variation in type and concentration of olefin and acid halide comonomer, and degree of reaction with the modifier, it is possible to tailor the polymeric modifiers to any particular application. The reaction of the acid halide group with the modifier can be controlled to give rise to complete conversion or a fraction thereof. More vigorous reaction conditions, e.g., longer reaction times and higher temperatures and higher concentrations of the modifier will cause a higher degree of conversion. Optimum conditions will differ somewhat with each modifier and each base copolymer. In general, the reaction is most conveniently carried out by using excess quantities of the modifier and letting the reaction proceed to 40 to 80 percent conversion. Accordingly, it is generally preferred to employ a base copolymer which contains acid halide groups in excess of the modifier concentration desired in the polymeric modifier.

A typical method of preparing the polymeric modifiers of the present invention is as follows: Into a glass reaction vessel is charged 225 parts of a hydrocarbon solvent, such as toluene, and 5 parts of an ethylene methacrylyl chloride copolymer having a molecular weight corresponding to a melt index of 40 dg./min. and containing 27 weight percent of the acid chloride comonomer, based on copolymer. The reaction mixture is agitated at 60° C. until the copolymer is dissolved in the solvent. To the solution is added 3 parts of the modifying compound, or such other quantity as will be from 100 to 150 percent of the stoichiometric quantity required to react with all chloride groups of the acid copolymer. Where the modifier is insoluble in the hydrocarbon solvent, i.e., is too polar, the solvent system can be modified by the addition of limited quantities of inert polar solvents, such as pyridine. Such solvents do not cause the precipitation of the copolymer and facilitate solution and, hence, the reaction of the modifier with the acid halide copolymer. Thus, one may add 20 parts of pyridine to the reaction mixture. The reaction mixture is agitated for 16 hours at 60° C. while nitrogen is passed through the mixture. Nitrogen facilitates the removal of hydrogen chloride liberated by the reaction. If the modifier is only slightly soluble in the solvent system employed, it may be advantageous to lengthen reaction time and add the modifier gradually to the reaction mixture. Higher temperatures may, of course, also be employed. The resulting reaction mixture is then optionally treated with ammonia to inactivate remaining acid halide groups in the copolymer by forming the amide. The polymeric modifier formed is isolated by precipitation using a large excess of a strongly polar solvent such as 2000 parts of acetone followed by filtration and drying.

Table I shows the type of compounds which react with the acid halide copolymers to give the polymeric modifiers of the present invention using the above-described procedure. Although not all of the compounds illustrated have a known utility when incorporated as polymeric modifiers in high molecular weight polyolefin resins, it will be apparent that the formation of the acid halide copolymer reaction product with these compounds illustrates the scope of the present invention which, however, is not to be construed as being limited to the particular examples illustrated. The table further illustrates that one or more of the active hydrogen containing groups may be present. Taking the reaction environment into consideration, the acid halide group will react with the most reactive of these groups. Unless substantially less than stoichiometric quantities of the modifier and long reaction times are employed, those modifiers containing more than one active hydrogen group will not react twice with the acid halide copolymer.

The degree of reaction is obtained by taking a sample of the polymeric modifier and subjecting it to infrared analysis.

| Reactive Group | Compound | Polymeric Modifier | Utility |
|---|---|---|---|
| —NH₂ primary amine, amide groups | (1) 2(o-aminophenyl)benzotriazole | | Ultraviolet Screen. |
| | (2) p-Aminophenol | | Do. |
| | (3) N-aminopropylmorpholine | | Antistatic Agent. |
| | (4) Ethanol amine | | Do. |
| | (5) | | Dye. |

| Reactive Group | Compound | Polymeric Modifier | Utility |
|---|---|---|---|
| —NH$_2$ primary amine, amide groups | (6) N-phenylphenylene diamine | | Stabilizer. |
| | (7) 2-aminopyridine | | Ion Exchange Activity. |
| | (8) 4-amino-1-naphthalene Sulfonic Acid. | | |
| | N-aminoacetoanilide | | Antistatic Agent. |
| | (10) β-Aminoanthraquinone | | |
| | (11) p-Aminobenzonitrile | | |

| Reactive Group | Compound | Polymeric Modifier | Utility |
|---|---|---|---|
| —NH₂ primary amine, amide groups | (12) $H_2N-CH_2-CH_2-SO_3H$<br>Taurine | $CH_3-C(CH_2)(CH_3)-\overset{O}{\underset{\|}{C}}-\overset{H}{\underset{\|}{N}}-CH_2-CH_2-SO_3H$ | Antistatic Agent. |
| —NH₂ primary amine, amide | (13) $H_2N-NH-\text{C}_6H_5$<br>Phenylhydrazine | $CH_3-C(CH_2)(CH_3)-\overset{O}{\underset{\|}{C}}-NH-NH-\text{C}_6H_5$ | |
| | (14) $H_2N-\text{C}_6H_4-NO_2$<br>p-Aminonitrobenzene | $CH_3-C(CH_2)(CH_3)-\overset{O}{\underset{\|}{C}}-NH-\text{C}_6H_4-NO_2$ | |
| | (15) cyclic $H_2NP$ phosphoramide structure<br>1,3-propanediol phosphoramide | $CH_3-C(CH_2)(CH_3)-\overset{O}{\underset{\|}{C}}-HN-P(O-CH_2-CH_2-O)$ | Flame Retardant. |
| | (16) $H_2N-CH_2-CH_2-Si(OEt)_3$<br>Aminoethyl-triethoxysilane | $CH_3-C(CH_2)(CH_3)-\overset{O}{\underset{\|}{C}}-HN-CH_2-CH_2-Si(OEt)_3$ | Water Repellant. |
| | (17) Anthranilic Acid (o-$H_2N$-$C_6H_4$-COOH) | $-CH_2-C(CH_2)(CH_2)-\overset{O}{\underset{\|}{C}}-\overset{H}{\underset{\|}{N}}-\text{C}_6H_4-COOH$ | Chelating Agent. |

| Reactive Group | Compound | Polymeric Modifier | Utility |
|---|---|---|---|
| —NH₂ primary amine, amide | (18) H₂N—CH₂—CH₂—CN  β-Aminopropionitrile | | Antistatic Agent. |
| | (19) p-Aminophenyl coumarin | | Optical Brightening Agent. |
| HN secondary amine, amide, imide | (20) Piperidine | | Plasticizer. |
| | (21) Diethanolamine | | Antistatic Agent. |
| | (22) N-methyl piperazine | | |
| | (23) Dibenzylamine | | |

| Reactive Group | Compound | Polymeric Modifier | Utility |
|---|---|---|---|
| Alcoholic hydroxyl | (24) HO—(CH₂CH₂O)₁₀—⌬ <br> Monophenyl ether of polyethylene oxide | —CH₂—C(CH₃)(CH₂—)—O—C(=O)—O(CH₂—CH₂O)₁₀—⌬ | Antistatic Agent. |
| | (25) HO—CH₂—(CF₂—CF₂)₃CF₃ <br> Tetrafluoroethylene telomer alcohol | —CH₂—C(CH₃)(CH₂—)—O—C(=O)—O—CH₂—(CF₂—CF₂)₃CF₃ | Oil and Water Repellant. |
| | (26) HO—φ—C(NH—C—φ—OCH₃)=N—φ—OCH₃ <br> 1-hydroxyphenyl-3,4-p-methoxyphenyl imidazole | —CH₂—C(CH₃)(CH₂—)—O—C(=O)—O—φ—C(NH—C—φ—OCH₃)=N—φ—OCH₃ | Photochromic Additive. |
| | (27) HO—CH₂—CH₂—O—CH₂—CH₂—O—CH₃ <br> Methyl ether of diethylene glycol | —CH₂—C(CH₃)(CH₂—)—O—C(=O)—O—CH₂CH₂O CH₂CH₂O CH₃ | Antistatic Agent. |
| | (28) HO—CH₂—CH=CH₂ <br> Allyl alcohol | —CH₂—C(CH₃)(CH₂—)—O—C(=O)—OCH₂—CH=CH₂ | Double bond for further reaction. |
| | (29) HOCH₂—⌬(t-butyl)(t-butyl)—OH <br> 4-hydroxymethyl-2,6-di-t-butyl phenol | —CH₂—C(CH₃)(CH₂—)—O—C(=O)—OCH₂—⌬(t-butyl)(t-butyl)—OH | Antioxidant. |

| Reactive Group | Compound | Polymeric Modifier | Utility |
|---|---|---|---|
| Alcoholic hydroxyl | (30) Tetrahydrofurfuryl alcohol | | |
| | (31) p-Hydroxybenzaldehyde | | Ultraviolet Screen. |
| | (32) 2,4-dihydroxybenzophenone | | Precursor to Ultraviolet Screen. |
| | (33) Resorcinol monobenzoate | | Antistatic Agent. |
| | (34) Hydracrylonitrile | | Precursor to Ultraviolet Screen. |
| | (35) p-t-Butyl phenol | | |

| Reactive Group | Compound | Polymeric Modifier | Utility |
|---|---|---|---|
| Misc. active hydrogen plus sodium derivatives | (36) Cl,Cl,Cl,Cl,Cl-C6-ONa (sodium pentachlorophenoxide) | [structure] | Flame Retardant. |
| | (37) Diethyl malonate and sodium salt: H₃C–C(COOC₂H₅)(COOC₂H₅), NaCH(COOC₂H₅)(COOC₂H₅) | [structure] | |
| | (38) Sodium salt of 2,4-dihydroxybenzophenone | [structure] | Ultraviolet Screen. |
| | (39) Sodium salt of dimethyl dithiocarbamate: NaS–C(=S)–N(CH₃)(CH₃) | [structure] | |
| | (40) Mercaptobenzothiazole | [structure] | |
| | (41) Benzene phosphinic Acid: HO–P(=O)(H)–C₆H₅ | [structure] | Flame Retardant. |
| | (42) Sodium derivative or pyrrolidone | [structure] | Dye Acceptor. |

| Reactive Group | Compound | Polymeric Modifier | Utility |
|---|---|---|---|
| Misc. active hydrogen plus sodium derivatives | (43) Benzenethiol: H—S—⌬ | CH₃—C(CH₂—)(CH₂—)—S(=O)(=O)—⌬ | Stabilizer. |
| | (44) Sodium derivative of ethyl carbamate: Na—N(H)—C(=O)—O—C₂H₅ | CH₃—C(CH₂—)(CH₂—)—N(H)—C(=O)—O—C₂H₅ | |
| | (45) bis(Methyl sulfonyl)imide Sodium derivative: CH₃—SO₂—N(Na)—SO₂—CH₃ | CH₃—C(CH₂—)(CH₂—)—N(SO₂—CH₃)(SO₂—CH₃) | |
| Aromatic hydrogen plus 1 part of AlCl₃ | (46) 2,6-di-t-butylphenol (t-butyl, OH, t-butyl on phenol) | CH₃—C(CH₂—)(CH₂—)—(2,6-di-t-butyl-4-hydroxyphenyl) | Antioxidant. |
| | (47) 4-phenyl-2,6-di-t-butyl phenol | CH₃—C(CH₂—)(CH₂—)—(biphenyl with t-butyl, OH, t-butyl) | Do. |
| | (48) Phenyl salicylate (OH, C(=O)—O—⌬) | CH₃—C(CH₂—)(CH₂—)—(salicylate phenyl ester) | Ultraviolet screen. |
| | (49) Chlorobenzene | CH₃—C(CH₂—)(CH₂—)—C₆H₄—Cl | Plasticizer. |

| Reactive Group | Compound | Polymeric Modifier | Utility |
|---|---|---|---|
| Aromatic hydrogen plus 1 part of AlCl₃ | (50) $\begin{array}{c}H\\ \\CH_3\end{array}C=C\begin{array}{c}CH_3\\ \\CH_3\end{array}$ Trimethyl ethylene | $-CH_2-C(CH_3)-CH_2-$ with $O=C-O-CH_2-C(CH_3)=C(CH_3)_2$ (approx.) | |
| Grignard reagents | (51) CH₃MgCl  Methyl magnesium chloride | $-CH_2-C(CH_3)-CH_2-$ with $O=C-CH_2CH_3$ and $CH_2OH$ | |
| | (52) [naphthalene]-MgCl  Naphthalene magnesium chloride | $-CH_2-C(CH_3)-CH_2-$ with $O=C-$[naphthalene] | |

The invention is further illustrated by the following detailed examples. Unless otherwise stated, all percentages are by weight.

Example I

Into a reaction vessel was charged 225 g. of toluene and 25 g. of pyridine. The mixture was heated to 70° C. and 5 g. of an ethylene methacrylyl chloride copolymer, containing 27 percent of methacrylyl chloride and having a molecular weight corresponding to 40 dg./min., was dissolved in the solvent mixture. On solution 12 g. of "Igepal" CO-630, having the formula

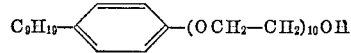

was added. The reaction was continued for a period of 24 hours at 70° C. At the end of that time, ammonia was passed into the solution to convert any excess methacrylyl chloride to the amide. The reaction mixture was then cooled and poured into an excess of acetone, filtered, washed with acetone and vacuum dried. A sample of the soft, waxy, water-sensitive polymer product obtained was pressed into a thin film which on infrared analysis showed to have 59 percent of the methacrylyl chloride groups converted to the "Igepal" ester of the acid chloride copolymer giving 25 percent of "Igepal" in the polymer. The resulting polymeric modifier when added to polyethylene in 1.0 percent concentration improved its antistatic properties.

Example II

Into a reaction vessel was charged 225 g. of toluene and 25 g. of pyridine. To the mixture was added 5 g. of an ethylene methacrylyl acid chloride copolymer containing 27 percent of methacrylyl chloride and having a molecular weight corresponding to a melt index of 40 dg./min. The mixture was agitated at 65° C. until the polymer dissolved and 5 g. of 2-(o-aminophenyl)benzotriazole was added. The reaction mixture was then agitated at 65° C. for 16 hours. At the end of the reaction period, ammonia was passed through the solution to convert unreacted methacrylyl chloride to methacrylamide. The polymeric product was recovered by pouring the reaction mixture into an excess of acetone, filtering, washing and vacuum drying the precipitate formed. Infrared analysis of a thin film of the polymer indicated that about 85 percent of the acid chloride groups had reacted with the benzotriazole giving a polymeric modifier containing about 33 percent of the benzotriazole attached to the polymer through amide linkages. The polymeric modifier was effective as an ultraviolet light screening compound when added to polyethylene in concentrations of .5 percent by weight.

Example III

To a 225 g. toluene solution of 5 g. of an ethylene methacrylyl chloride copolymer, containing 27 percent of acid chloride and having a molecular weight corresponding to a 40 dg./min. melt index, was added 3.4 g. of 4-hydroxymethyl-2,6-di-t-butyl phenol and 25 ml. of pyridine. The reaction mixture was agitated for eight hours at 43° C. At the end of that time 3.3 g. of 2(o-aminophenyl)benzotriazole was added to the reaction mixture and the reaction mixture was agitated for 16 hours at 60° C. Ammonia was then passed through the solution and the resulting polymeric modifier was isolated as described in Example I. Infrared analysis of a thin film of the polymeric modifier showed that about equal amounts of the phenol and the benzotriazole were bonded to the copolymer and that the polymeric modifier contained about 15 percent of each species of modifier. When added to polyethylene in a concentration of 1.0 percent the polymeric modifier improved both the oxidation stability and screened out ultraviolet light.

Example IV

Onto a steam heated 2 inch diameter two roll rubber mill at 100–120° C. was placed 28 g. of an ethylene methacrylyl chloride copolymer containing 27 weight percent of methacrylyl chloride. Dry nitrogen was sparged over the mill to prevent access of moisture. As soon as the polymer formed a molten band on the mill, 20 g. (1.8×stoichiometric) of 2(o-aminophenyl) benzotriazole was slowly added to the band and the mixture milled for 5 minutes after all reactant was added. The polymer was then removed from the mill and 44 g. of product was dissolved in 500 g. of water free benzene and precipitated into 1500 cc. of acetone, any unreacted benzotriazole remaining in solution. About 35 g. of polymer product was obtained which, as indicated by infrared analysis of a thin film, contained about 37 percent of benzotriazole chemically attached to the polymer through the amide linkage.

Example V

To a rapidly stirred solution cooled to 15° C. consisting of 240 g. of distilled water containing 12.5 g. (0.10 mole) of taurine, $H_2NCH_2CH_2SO_3H$, and 4.75 g. (0.1189 mole) of sodium hydroxide was added slowly over a period of 30 minutes a solution of 7.0 g. ethylene methacrylyl chloride copolymer (0.0189 mole methacrylyl chloride) in 140 g. of water-free benzene. The mixture was vigorously stirred for 15 minutes longer with the temperature kept below 25° C. The mixture was then poured into 500 cc. acetone. The precipitate formed was filtered, treated with dilute hydrochloride acid solution, filtered again and washed with water and then acetone. An infrared spectra of a thin film of the product indicated about 93 percent of the acid chloride groups were converted to the amide of taurine. The polymer therefore contained about 24 percent taurine.

Example VI

Into a reaction vessel was placed 230 g. of water-free toluene and 4 g. of an ethylene methacrylyl chloride copolymer containing 7.5 percent acid chloride (.00287 mole methacrylyl chloride). The mixture was heated to 70° C. to dissolve the polymer and 10 ml. of 3 molar methyl magnesium bromide (.030 mole) in diethyl ether solution was added slowly over a period of 10 minutes. The reaction mixture was stirred for two hours then poured into 600 g. acetone to precipitate the reaction product. The precipitated polymer was isolated and an infrared analysis indicated that the acid chloride group had been completely converted to a tertiary alcohol.

Example VII

Into a reaction flask was placed 250 g. of trichloroethylene and 5 g. of a butadiene acrylonitrile methacrylic acid terpolymer containing the monomers in a 48.4/43/8.6 ratio. The mixture was heated to boiling and stirred for four hours. At the end of that time the polymer was finely dispersed and 1 g. (1.17×stoichiometric) of phosphorus pentachloride in 25 g. toluene was added and the mixture stirred and refluxed for one hour to convert the acid groups to the acid chloride. The mixture was then poured into 600 cc. of hexane to isolate the acid chloride containing polymer. The polymer was then redispersed in 250 g. trichloroethylene and 1 g. (1.16×stoichiometric) of 2(o-aminophenyl)benzotriazole when then added to the dispersion. After heating to 80° C. for one hour, the dispersion was poured into four volumes of hexane, and the precipitated polymer washed with acetone. An infrared spectrum of a thin film of the product showed about 20 percent of the acid chloride groups converted to the amide of the benzotriazole.

Example VIII

In a reaction flask was placed 200 g. of 1,1,2,2-tetrachloroethane and 4 g. of an ethylene methacrylyl chloride copolymer containing 17.5 percent acid chloride (.067 mole methacrylyl chloride). The mixture was heated for four hours at 75° C. to dissolve the polymer, then 200 g. of purified nitrobenzene was added and the mixture stirred for 16 hours at 85° C. The solution was then cooled to 45° C. and 1.75 g. stannic chloride (.067 mole) was added followed by a solution of 30 g. of nitrobenzene containing 1.38 g. (.067 mole) of 2,6-di-t-butyl phenol and 1.77 g. (.068 mole) of stannic chloride. The mixture was stirred at 45° C. for five hours then poured into two liters of acetone containing 100 cc. of water to precipitate the reaction product. An infrared analysis of a thin film of the isolated polymer indicated that a substantial amount of the acid chloride was converted to the ketone of the hindered phenol.

Example IX

To 350 cc. of rapidly stirred water at 95° C. was added 15 g. of a powdered methyl vinyl ether-maleic anhydride 37/63 copolymer. The polymer gradually dissolved resulting in a clear solution which was poured into a 50/50 dioxane-methyl isobutyl ketone mixture to precipitate the hydrolyzed polymer. An infrared analysis of a thin film of the vacuum dried polymer indicated about 50 percent of the anhydride groups were hydrolyzed.

In a conventional reaction vessel was placed 3 g. of the hydrolyzed polymer (.0009 mole each of anhydride and acid) and 100 moles of dimethyl formamide. The polymer readily dissolved and 7.5 g. (.036 mole) of phosphorus pentachloride was added, and the mixture heated to 65° C. for one hour. The solution was then poured into 250 g. of diethyl ether producing an oily precipitate which was isolated and redissolved in 100 ml. of dimethyl formamide. To the new solution was added 4 g. (.019 mole) of 2(o-aminophenyl)benzotriazole and the solution was heated to boiling for one hour. The solution was then poured into an excess of diethyl ether at room temperature and the precipitated product filtered, washed with benzene to remove unreacted benzotriazole and vacuum dried. An infrared analysis of the polymeric modifier product indicated conversion of about 30 percent of the carbonyl groups to the amide of the benzotriazole.

Example X

Into a conventional reaction flask was placed 3 g. of an ethylene maleic anhydride 22/78 copolymer (.0234 mole anhydride) and 100 g. dimethyl formamide. The polymer dissolved readily at room temperature. To this solution was added 5.5 g. (.026 mole) of phosphorus pentachloride and the solution was then heated to 65° C. for one hour. The solution was then poured into 250 cc. of diethyl ether to precipitate the acid chloride containing polymer. The polymer was then redissolved in a second 100 g. of dimethyl formamide and 5 g. of 2(o-aminophenyl)benzotriazole was added and the solution heated to 85° C. for one hour. The solution was then poured into .3 volume of ether, the precipitate formed was filtered, washed with benzene and vacuum dried. An infrared analysis of the product indicated at least 20 percent of the anhydride groups were converted to the amide of the benzotriazole.

Example XI

Into a conventional reaction flask was placed 150 g. of water-free toluene and 5 g. of an ethylene-vinyl acetate-methacrylic acid 70/20/10 terpolymer, the acid of which had been converted to the extent of 25 percent to the methacrylyl chloride (0.00125 mole of acid chloride). The mixture was heated to dissolve the polymer and 2 g. (.0095 mole) of 2(o-aminophenyl)benzotriazole was added to the solution. After heating the solution for ½ hour at 85° C., it was poured into 3 volumes of hexane to precipitate the product polymer. The precipitate was washed with benzene and dried. An infrared analysis of a thin film of the product polymer indicated complete conversion of the acid chloride to the amide of the benzotriazole.

Example XII

In a conventional reaction vessel was placed 100 g. of carbon tetrachloride, 50 g. of toluene and 3 g. of a methyl methacrylate-methacrylyl chloride 81/19 copolymer (.0054 mole acid chloride). The mixture was stirred and heated until the polymer dissolved, then 2 g. (.0095 mole) of 2-(o-aminophenyl)benzotriazole was added and the solution heated for one hour at 80° C. The solution was then poured into 3 volumes of hexane and the precipitated polymer filtered, washed with acetone and dried. An infrared analysis of the polymeric modifier product indicated complete conversion of the acid chloride to the amide of the benzotriazole.

Example XIII

Into a conventional reaction flask was placed 225 g. of water-free toluene and 5 g. of an ethylene-methacrylyl chloride 73/27 copolymer (.0129 mole acid chloride). The mixture was heated to dissolve the polymer after which 150 g. dioxane and 2 g. (.0187 mole) of the sodium derivative of 2-pyrrolidone were added. The mixture was stirred and heated to 45° C. for 24 hours then poured into one liter of acetone. The precipitated product was filtered, washed with acetone, then water and vacuum dried. An infrared analysis of the polymeric modifier product indicated about 90 percent of the acid chloride reacted with the pyrrolidone derivative.

The foregoing examples have illustrated the formation of polymeric modifiers. It will be apparent that more than one copolymer can be employed with one modifier to form the polymeric modifier and similarly that more than one modifier can be employed with a single copolymer. The latter is particularly advantageous since it allows the improvement of several properties of the polyolefin resin by the addition of a single additive.

It is to be understood that the utility of the polymeric modifier is not limited to polyolefins, but can be employed broadly in all resinous substances such as polyesters, polycarbonates, polyoxymethylenes, polyamides, cellulose esters, polyvinyl halides, polyacrylates, etc.

The utility of the polymeric modifiers of the present invention is further illustrated by Table II in which a comparison is made between the unstabilized polypropylene, polypropylene with a modifier and polypropylene with a polymeric modifier. The oxidative stability of the sample was established by exposure to air at 150° C., and the weatherability by exposure in the Weatherometer. Failure of the material was established by bending the material.

copolymer containing at least 50 mole percent, based on copolymer, of a polymerized olefin wherein the olefin monomer has the formula $RCH=CH_2$, where R is a radical selected from the class consisting of hydrogen, alkyl radicals having from 1 to 8 carbon atoms, alkenyl radicals having 1 to 8 carbon atoms and aryl radicals having from 6 to 12 carbon atoms and at least 0.1 mole percent, based on copolymers, of a polymerized halide of an $\alpha,\beta$-ethylenically unsaturated carboxylic acid having from 3 to 8 carbon atoms, adding to said molten copolymer at least one modifying compound having a molecular weight of less than 2000 containing at least one group reactive with alkanoic acid halides, which group is selected from the class consisting of the alcoholic hydroxyl group, amino groups containing at least one hydrogen bonded to nitrogen, groups containing enolizable hydrogen attached to carbon, the mercapto group, the phosphino group, alkali metal salts of the foregoing groups, the Grignard reagent group and the hydrogen group where attached to an aromatic ring carbon atom in combination with a Friedel Crafts catalyst, reacting said molten copolymer and said added modifying compound by milling said molten copolymer and said added modifying compound, and recovering a polymeric modifier containing from 0.1 to 50 mole percent, based on copolymer, of said modifying compound bonded to said acid halide copolymer.

2. The process of claim 1 wherein the acid halide concentration is from 0.1 to 25 mole percent based on the copolymer.

3. The process of claim 1 wherein the olefin is ethylene.

4. The process of claim 1 wherein the acid halide copolymer is an ethylene acid halide interpolymer.

5. The process of claim 1 wherein the acid halide is methacrylyl acid chloride.

6. The process of claim 1 wherein the modifying compound is an amine containing at least one hydrogen bonded to nitrogen.

7. The process of claim 1 wherein the modifying compound is an alcohol.

8. The process of claim 1 wherein the modifying compound is an amide containing at least one hydrogen bonded to nitrogen.

9. The process of claim 1 wherein prior to recovery the reaction product is further reacted with ammonia until all unreacted acid halide groups are formed into amide groups.

10. A process for preparing polymeric modifiers which comprises forming a molten ethylene carboxylic acid halide copolymer having a melt index in the range of 0.1 to 5000 dg./min. containing at least 50 mole percent, based on copolymer, of a polymerized ethylene and from 0.1 to 25 mole percent, based on copolymer, of an acid halide

TABLE II

| Sample: | Polymeric Modifier | Modifier Type [1] | Percent of Modifier | Oxidative Stability Time to Failure | Weatherability Failure, hours |
|---|---|---|---|---|---|
| 1 | | Control | | 1-2 hours | 40 |
| 2 | | 4-hydroxymethyl-2,6-di-t-butyl phenol | 0.5 | 31 days | 116 |
| 3 | 0.5 | Ester of 4-hydroxymethyl-2,6-di-t-butyl phenol | 0.17 | 24 days | 150 |
| 4 | | 2-(o-aminophenyl)benzotriazole | 0.2 | 1-2 days | 121 |
| 5 | 0.5 | Amide of 2-(o-aminophenyl)benzotriazole | 0.17 | 14 days | 240 |
| 6 | 0.5 | {Amide of 2-(o-aminophenyl) benzotriazole / Ester of 4-hydroxymethyl 2-6-di-t-butyl phenol} | 0.10 / 0.10 | 20 days | 275 |
| 7 | | 2,6-di-t-butyl phenol | 0.24 | 10 days | 140 |
| 8 | 0.5 | Ketone of 2,6-di-t-butyl phenol (by Friedel-Crafts synthesis) | 0.13 | 25 days | 230 |
| 9 | | 2,4-dihydroxy benzophenone | 0.5 | 3 days | 80 |
| 10 | 1.0 | Ester of 2,4-dihydroxy benzophenone | 0.4 | do | 278 |

[1] All samples except for Sample 1 contain ¼ percent distearyl thioproprionate.

In addition to their utility as additives, the polymeric modifiers also have utility per se. Thus, they can be employed as coating resins, in the form of film, dispersions and solutions and as laminating adhesives.

We claim:

1. A process for preparing polymeric modifiers which comprises forming a molten olefin carboxylic acid halide of an $\alpha,\beta$-ethylencially unsaturated carboxylic acid having from 3 to 8 carbon atoms, adding to said molten copolymer an amine containing nitrogen bonded to hydrogen having a molecular weight of less than 2000, reacting said molten copolymer and said added amine by milling said molten copolymer and said added amine, and recovering a polymeric modifier containing from 0.1 to 50 mole percent, based on copolymer, of said amine bonded to said acid halide copolymer.

References Cited

UNITED STATES PATENTS 2,464,425  7/1953  Barry _____ 260—949
2,994,690  8/1961  Kuntz _____ 260—853

OTHER REFERENCES

Boyer et al.: Bull. Soc. Chem., France, 1958, 240–4 (C.A. 52:15952h).

Noller, C. R.: Chemistry of Organic Compounds, Philadelphia, N. B. Saunders, 1952, pages 244 and 160. QD 253N65.

WILLIAM H. SHORT, *Primary Examiner.*

M. GOLDSTEIN, *Assistant Examiner.*

U.S. Cl. X.R.

260—2.1, 47, 80.3, 80.73, 80.78, 80.8, 88.1, 86.7, 823, 857, 873, 899, 901